United States Patent
Noda et al.

(10) Patent No.: US 10,027,672 B2
(45) Date of Patent: Jul. 17, 2018

(54) ACCESS RESTRICTION DEVICE, ON-BOARD COMMUNICATION SYSTEM AND METHOD FOR COMMUNICATION RESTRICTION

(71) Applicants: AUTONETWORKS TECHNOLOGIES, LTD, Yokkaichi, Mie (JP); SUMITOMO WIRING SYSTEMS, LIMITED, Yokkaichi, Mie (JP); SUMITOMO ELECTRIC INDUSTRIES, LTD., Osaka-shi, Osaka (JP)

(72) Inventors: Tetsuya Noda, Mie (JP); Satoshi Horihata, Mie (JP); Hiroshi Okada, Mie (JP); Naoki Adachi, Mie (JP)

(73) Assignees: AUTONETWORKS TECHNOLOGIES, LIMITED, Mie (JP); SUMITOMO WIRING SYSTEMS, LIMITED, Mie (JP); SUMITOMO ELECTRIC INDUSTRIES, LIMITED, Osaka (JP)

( * ) Notice: Subject to any disclaimer, the term of this patent is extended or adjusted under 35 U.S.C. 154(b) by 230 days.

(21) Appl. No.: 14/764,019

(22) PCT Filed: Jan. 17, 2014

(86) PCT No.: PCT/JP2014/050734
§ 371 (c)(1),
(2) Date: Jul. 28, 2015

(87) PCT Pub. No.: WO2014/119380
PCT Pub. Date: Aug. 7, 2014

(65) Prior Publication Data
US 2015/0358329 A1  Dec. 10, 2015

(30) Foreign Application Priority Data

Jan. 31, 2013 (JP) ................................ 2013-017486
Mar. 18, 2013 (JP) ................................ 2013-055403

(51) Int. Cl.
*H04L 29/06* (2006.01)
*H04W 12/08* (2009.01)
(Continued)

(52) U.S. Cl.
CPC .............. *H04L 63/102* (2013.01); *G06F 8/65* (2013.01); *G06F 21/57* (2013.01); *H04L 63/105* (2013.01);
(Continued)

(58) Field of Classification Search
CPC ....... H04L 63/102; H04L 67/125; G06F 8/65; G06F 21/57; H04W 12/08
See application file for complete search history.

(56) References Cited

U.S. PATENT DOCUMENTS 6,094,618 A   7/2000 Harada
6,154,688 A   11/2000 Dominke et al.
(Continued)

FOREIGN PATENT DOCUMENTS

JP  H10-250417 A  9/1998
JP  H11-115651 A  4/1999
(Continued)

OTHER PUBLICATIONS

Apr. 28, 2014 International Search Report issued in PCT/JP2014/050734.

*Primary Examiner* — Jeffrey Pwu
*Assistant Examiner* — Thong Truong
(74) *Attorney, Agent, or Firm* — Oliff PLC

(57) ABSTRACT

An access restriction device as well as an on-board communication system and a method for communication restric-
(Continued)

tion, which prevent outside leakage of information caused by unauthorized access of malicious programs to an in-car network. The communication between the in-car network of the vehicle and an external device is performed by a security controller. The security controller can perform addition or update of a program involving processing for transmission and reception of the information. The security controller performs processing for restricting access to information of the in-car network performed by program execution according to an access authorization level of each program and an access permission level of each type of information. The security controller restricts the transmission depending on the access authorization level of each program and the access permission level of each type of information in case of transmitting the information to the in-car network by the program execution.

10 Claims, 9 Drawing Sheets

(51) Int. Cl.
    *H04L 29/08*     (2006.01)
    *G06F 8/65*     (2018.01)
    *G06F 21/57*     (2013.01)
    *H04W 4/04*     (2009.01)

(52) U.S. Cl.
    CPC ............ *H04L 67/125* (2013.01); *H04W 4/046* (2013.01); *H04W 12/08* (2013.01); *G06F 2221/2113* (2013.01)

(56) References Cited

U.S. PATENT DOCUMENTS

| | | | |
|---|---|---|---|
| 6,574,734 B1* | 6/2003 | Colson | G06F 9/445 701/1 |
| 8,707,044 B2 | 4/2014 | Shim et al. | |
| 2005/0256614 A1* | 11/2005 | Habermas | G06F 8/65 701/1 |
| 2008/0140278 A1* | 6/2008 | Breed | G06F 8/65 701/31.4 |
| 2008/0244757 A1 | 10/2008 | Nakagaki | |
| 2010/0031212 A1* | 2/2010 | Dong | G06F 17/50 716/100 |
| 2013/0302758 A1* | 11/2013 | Wright | G07C 5/008 434/65 |
| 2014/0012435 A1 | 1/2014 | Sugihara | |

FOREIGN PATENT DOCUMENTS

| | | |
|---|---|---|
| JP | 2008-239021 A | 10/2008 |
| JP | 2010-125925 A | 6/2010 |
| JP | 2012-500516 A | 1/2012 |
| JP | 2012-091755 A | 5/2012 |
| JP | 2012-178035 A | 9/2012 |
| JP | 2012-212272 A | 11/2012 |
| JP | 2012-240493 A | 12/2012 |
| WO | 2012/132401 A1 | 10/2012 |

\* cited by examiner

FIG. 3

ACCESS AUTHORIZATION LEVEL TABLE

| PROGRAM DISTRIBUTOR | ACCESS AUTHORIZATION LEVEL |
|---|---|
| COMPANY A VEHICLE MANUFACTURER | 3 |
| COMPANY B | 2 |
| COMPANY C | 2 |
| ⋮ | ⋮ |
| COMPANY Y | 1 |
| COMPANY Z | 1 |

FIG. 4

ACCESS PERMISSION LEVEL TABLE

| INFORMATION TYPE | ACCESS PERMISSION LEVEL |
|---|---|
| ENGINE CONTROL INFORMATION | 3 |
| USER INFORMATION | 3 |
| POSITION INFORMATION | 2 |
| VEHICLE VELOCITY INFORMATION | 1 |
| ⋮ | ⋮ |

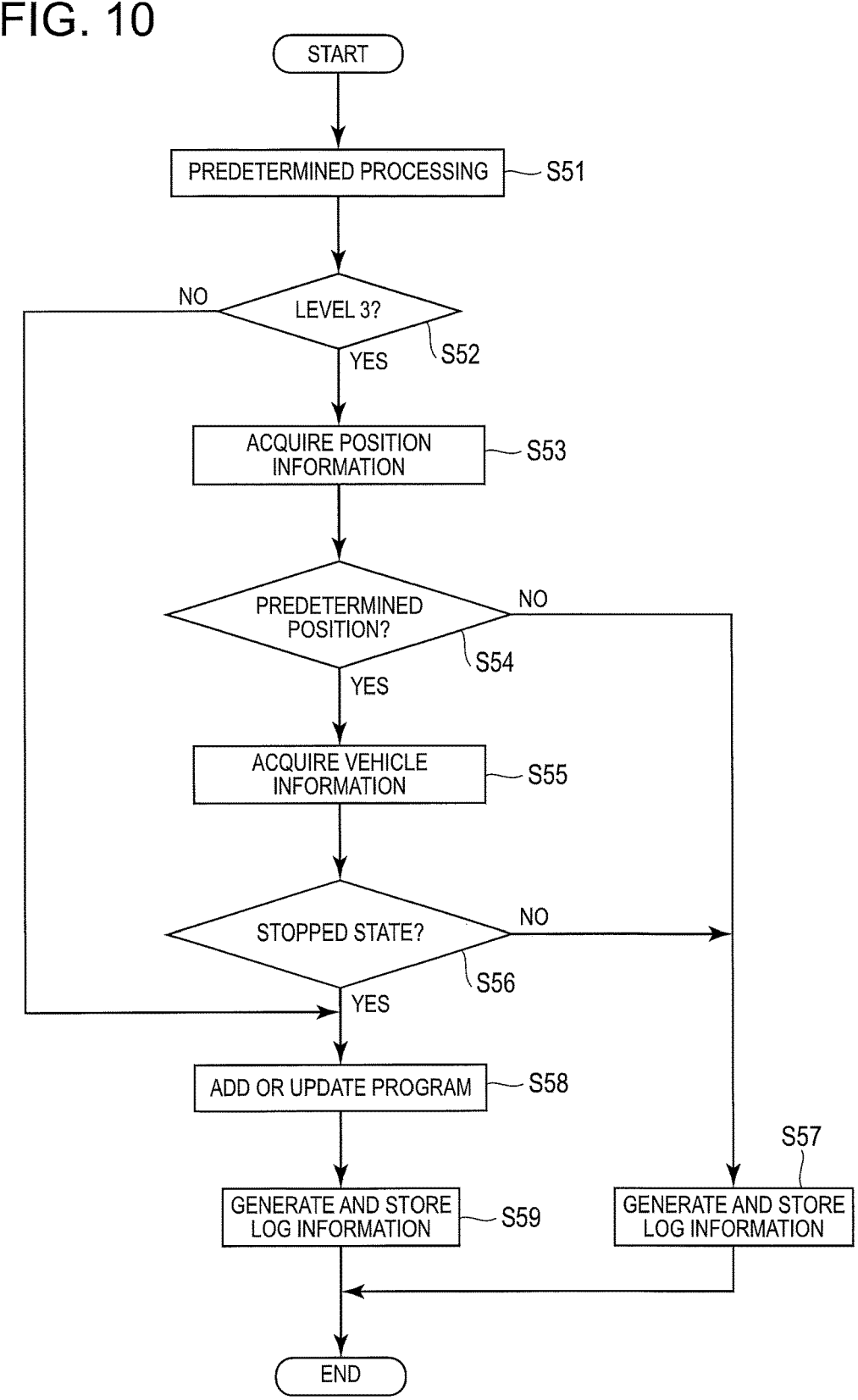

ACCESS RESTRICTION DEVICE, ON-BOARD COMMUNICATION SYSTEM AND METHOD FOR COMMUNICATION RESTRICTION

TECHNICAL FIELD

The present exemplary embodiments relate to access restriction devices for preventing programs from performing improper access to an in-car network in devices such as gateways of vehicles capable of addition and update of programs and the like, as well as on-board communication systems capable of restricting communication of on-board devices and external devices with use of the devices and methods for communication restriction.

BACKGROUND ART

The functionality of electronic devices installed in vehicles is steadily advancing. As well as electronic devices relevant to running control, various electronic devices aimed for improvement in user comfort and amusement, for example, are installed in recent vehicles. In recent years, remarkable developments have been made in portable information processing terminals, such as mobile phones, smart phones and tablet terminals. Systems have been put into practice that perform processing by a combination of these information processing terminals and electronic devices inside the vehicle in order to provide even more sophisticated services to users.

The programs to be executed have also become more sophisticated in such sophisticated on-board electronic devices, which necessitates updates for upgrading programs in some cases. In some cases, different functions are necessary depending on the users. It is conceivable to improve convenience by enabling selection or customization of the functions according to users' preference in such cases, but it is necessary to add or update the program in some cases. In view of this, on-board electronic devices have been studied and developed in recent years in terms of techniques capable of adding or updating programs. For example, the technology known as "OSGi" (open services gateway initiative) has been employed for this.

In JP 2012-500516A, a system utilizing the OSGi technique making it possible to use networked mobile phones in vehicles was proposed. This system allows portable device client programs of on-board devices to communicate with portable devices, and to transmit dynamic application programs from portable devices to on-board devices. On the on-board devices or portable devices, it is possible to execute applications utilizing components of displays, speakers or the like of the vehicle.

SUMMARY

Problem to be Solved

However, in case on-board electronic devices are configured to be capable of adding, updating programs and so on, programs prepared by malicious third parties may be added and executed. In this case, there is the risk that malicious programs cause outside leakage of information to be transmitted and received with the in-car network, for example.

The present exemplary embodiments have been developed in view of the above problem, and is aimed to provide an access restriction device as well as an on-board communication system and a method for communication restriction, which prevent outside leakage of information due to unauthorized access of malicious programs to in-car networks.

Means for Solving the Problem

An access restriction device according to one aspect of the present exemplary embodiments, which is to be installed on a vehicle, may comprise a first communication unit which communicates with an on-board device by way of an in-car network arranged in the vehicle; a second communication unit which communicates with an external device; a program storage unit storing a program which performs processing concerning information to be transmitted and received with the first communication unit and/or processing concerning information to be transmitted and received with the second communication unit; a processing unit which executes one or a plurality of programs stored in the program storage unit and performs processing; a program addition/update means which performs addition or update of a program to be executed by the processing unit by means of communication of the second communication unit with the external device; a first determination means which determines, for each program, a level of access authorization with respect to information received with the first communication unit; a second determination means which determines, for each type of information received with the first communication unit, a level of access authorization for permission to access the information received with the first communication unit; and an access restriction means which restricts access to the information, depending on the level of access authorization of the program determined by the first determination means and the level of access authorization for the information determined by the second determination means, when an access request is made for the information received by the first communication unit in the processing performed by the processing unit when executing the program.

In the access restriction device according to the present exemplary embodiments, the access restriction means may restrict information transmission from the first communication unit to the on-board device, depending on the level of access authorization of the program determined by the first determination means and the level of access authorization for the information determined by the second determination means, when a request to transmit information from the first communication unit to the in-car network is made in the processing performed by the processing unit when executing the program.

The access restriction device according to the present exemplary embodiments may further comprise a position information acquisition means which acquires position information of the vehicle; a position determination means, which determines whether or not the position of the vehicle according to the position information acquired by the position information acquisition means is a predetermined position or within a predetermined position region; and a program addition/update restriction means, which restricts the addition or update of the program performed by the program addition/update means depending on a determination result of the position determination means.

In the access restriction device according to the present exemplary embodiments, the program addition/update restriction means may restrict the addition or update of the program performed by the program addition/update means depending on the access authorization level of the program and the determination result of the position determination means.

The access restriction device according to the present exemplary embodiments may further comprise a vehicle information acquisition means which acquires information regarding the vehicle; and the program addition/update restriction means may restrict the addition or update of the program performed by the program addition/update means depending on the information acquired by the vehicle information acquisition means.

The access restriction device according to the present exemplary embodiments may further comprise a vehicle stopping determination means, which determines whether or not the vehicle is in a stopped state, depending on the information acquired by the vehicle information acquisition means; and the program addition/update restriction means may restrict the addition or update of the program performed by the program addition/update means if the vehicle stopping determination means determines that the vehicle is not in the stopped state.

In the access restriction device according to the present exemplary embodiments, the information acquired by the vehicle information acquisition means may be velocity information of the vehicle and/or information indicating an operation state of a motor of the vehicle.

The access restriction device according to the present exemplary embodiments may comprise an access authorization level information storage unit, which stores access authorization level information in which distributors of program are associated with levels of access authorization; and the first determination means may determine the level of access authorization of the program on the basis of the access authorization level information stored in the access authorization level information storage unit.

The access restriction device according to the present exemplary embodiments may further comprise a blocking means which blocks the information transmission when the amount of information transmitted from the first communication unit to the in-car network surpasses a predetermined amount in the processing performed by the processing unit when executing the program.

In the access restriction device according to the present exemplary embodiments, the predetermined amount may be an amount determined according to the level of access authorization of the program.

The access restriction device according to the present exemplary embodiments may further comprise a log information generation means which, if the access restriction means restricts the access to information, generates log information regarding this access restriction; and a log information storage unit, which stores the log information generated by the log information generation means.

An on-board communication system according to one aspect of the present exemplary embodiments may comprise an access restriction device, and one or a plurality of on-board devices connected to the access restriction device by way of an in-car network; the access restriction device comprising a first communication unit which communicates with an on-board device by way of an in-car network arranged in the vehicle; a second communication unit which communicates with an external device; a program storage unit storing a program which performs processing concerning information to be transmitted and received with the first communication unit and/or processing concerning information to be transmitted and received with the second communication unit; a processing unit which executes one or a plurality of programs stored in the program storage unit and performs processing; a program addition/update means which performs addition or update of a program to be executed by the processing unit by means of communication of the second communication unit with the external device; a first determination means which determines, for each program, a level of access authorization with respect to information received with the first communication unit; a second determination means which determines, for each type of information received with the first communication unit, a level of access authorization for permission to access the information received with the first communication unit; and an access restriction means which restricts access to the information, depending on the level of access authorization of the program determined by the first determination means and the level of access authorization for the information determined by the second determination means, when an access request is made for the information received by the first communication unit in the processing performed by the processing unit when executing the program; and the on-board device may be configured to communicate with the external device by way of the access restriction device.

A communication restriction method according to the present exemplary embodiments utilize an access restriction device to be installed on a vehicle. The access restriction device may comprise a first communication unit which communicates with an on-board device by way of an in-car network arranged in the vehicle; a second communication unit which communicates with an external device; a program storage unit storing a program which performs processing concerning information to be transmitted and received with the first communication unit and/or processing concerning information to be transmitted and received with the second communication unit; a processing unit which executes one or a plurality of programs stored in the program storage unit and performs processing; a program addition/update means which performs addition or update of a program to be executed by the processing unit by means of communication of the second communication unit with the external device. The communication restriction method may restrict the communication of the on-board device and the external device by utilizing the access restriction device, and may comprise: a first determination step of determining, for each program, a level of access authorization for information received with the first communication unit; a second determination step of determining, for each type of information received in the first communication unit, a level of access authorization for permission to access information received with the first communication unit; and an access restriction step of restricting access to the information, depending on the level of access authorization of the program determined in the first determination step and the level of access authorization for the information determined in the second determination step, when an access request is made for the information received by the first communication unit in the processing performed by the processing unit when executing the program.

In one aspect of the present exemplary embodiments, the on-board device communicates with the external device, by way of the access restriction device provided with the first communication unit, which communicates with the on-board device via the in-car network, and the second communication unit, which communicates with the external device via wireless and/or wired communication. The access restriction device is configured to be capable of adding or updating a program to be executed in the processing unit. The program is acquired from the external device by means of communication of the second communication unit.

The access restriction device determines the level of access authorization for the information for each program individually, and determines the level required for having access to each type of information. In case the access request is made for information of the in-car network in the processing due to the program execution, the access restriction device permits the access to this information received with the first communication unit when the level of access authorization of this program amounts to the level required for the information relevant to the access request. On the other hand, the access restriction device forbids the access to this information when the level of access authorization of this program does not amount to the level required for the information.

With this access restriction, it is possible to provide sophisticated services by giving much information regarding the vehicle to programs with high reliability. And it is possible to prevent outside leakage of highly important information by restricting the information given to programs with low reliability.

In one aspect of the present exemplary embodiments, also in case that the information is transmitted to the on-board device from the first communication unit by way of the in-car network in the processing performed by the program execution, the access restriction device performs the same restriction. That is to say, the access restriction device permits the transmission of this information when the level of access authorization of the program amounts to the required level of the information to be transmitted, and forbids the transmission of this information when the level of access authorization of the program does not amount to the required level of the information to be transmitted. With this restriction of the information transmission, it is possible to prevent improper information transmission to the in-car network caused by unauthorized programs.

In one aspect of the present exemplary embodiments, the access restriction device acquires position information of the vehicle utilizing GPS (global positioning system) or the like, and determines whether or not the vehicle is positioned at the predetermined position or within a predetermined position region. For example, the access restriction device determines whether or not the vehicle is positioned at an address of a dealer of this vehicle or within a radius of several meters from this address. The access restriction device permits the addition or update of the program when the vehicle is positioned at the predetermined position or within the predetermined position region, and forbids the addition or update of the program when the vehicle is not positioned at the predetermined position or within the predetermined position region.

With this restriction of the addition or update of the program according to the position of the vehicle, it is possible to prevent malicious third parties from performing addition, update or the like unauthorized programs.

When adding or updating programs relevant to the control of the vehicle, this may affect the running of the vehicle. In one aspect of the present exemplary embodiments, the state of the vehicle is determined by acquiring vehicle information and the addition or update of programs is restricted accordingly. For example, vehicle velocity information of the vehicle, operation state information of a motor or the like is acquired, and it is determined whether the vehicle is in the stopped state on the basis of these information. When the vehicle is determined not to be in the stopped state, but rather determined to be in running state, the addition or update of the program is restricted. With this arrangement, it is possible to prevent the addition or update of the program during the running of the vehicle.

In case the access restriction device performs the restriction of the addition or update of the program depending on the position of the vehicle, it may be possible to perform the restriction in consideration of the level of access authorization of the program. For example, it is possible to achieve a configuration such that the restriction of the addition or update is performed depending on the position of the vehicle for programs with a high access authorization level, while the restriction of the addition or update is not performed depending on the position of the vehicle for programs with a low access authorization level.

In one aspect of the present exemplary embodiments, the access restriction device stores the access authorization level information in association with the distributor of the program and the level of access authorization. For example, in case a new program is added, the access restriction device can determine the level of access authorization of the program with reference to the access authorization level information. The distributor of the program can be determined on the basis of an electronic signature appended to the program, for example, or determined on the basis of information on addresses to which communication is directed when the program is added, for example.

In one aspect of the present exemplary embodiments, the access restriction device prevents the information transmission when the amount of information sent to the in-car network by the program execution surpasses the predetermined amount. In this configuration, it is possible to prevent a busy state of the in-car network caused by massive information which is sent to the in-car network by unauthorized programs.

When the access restriction device blocks the transmission depending on the amount of information, it is possible to block transmission in consideration of the level of access authorization of the program. For example, it is possible to achieve a configuration which permits the transmission of much information for programs with high access authorization level, and reduces the amount of information permitted to be transmitted for programs with low access authorization level.

In one aspect of the present exemplary embodiments, when performing the access restriction, the access restriction device generates the log information indicating the access restriction, and stores the same. With this arrangement, it is possible to examine the presence or absence of unauthorized programs in fixing, examining the vehicle or the like, for example.

In one aspect of the present exemplary embodiments, an access restriction device restricts access to information with a program depending on whether or not a level of access authorization of this program amounts to an information requirement level relevant to an access request, making it possible to perform the access restriction for programs with less reliability and prevent outside leakage of important information.

BRIEF DESCRIPTION OF THE DRAWINGS

FIG. 3 is a schematic view showing a configuration example of an access authorization level table.

FIG. 4 is a schematic view showing a configuration example of an access permission level table.

FIG. 10 is a flowchart showing a procedure for processing restriction of addition or update of programs performed by the security controller according to the second embodiment.

EMBODIMENTS

First Embodiment

Figure 1:
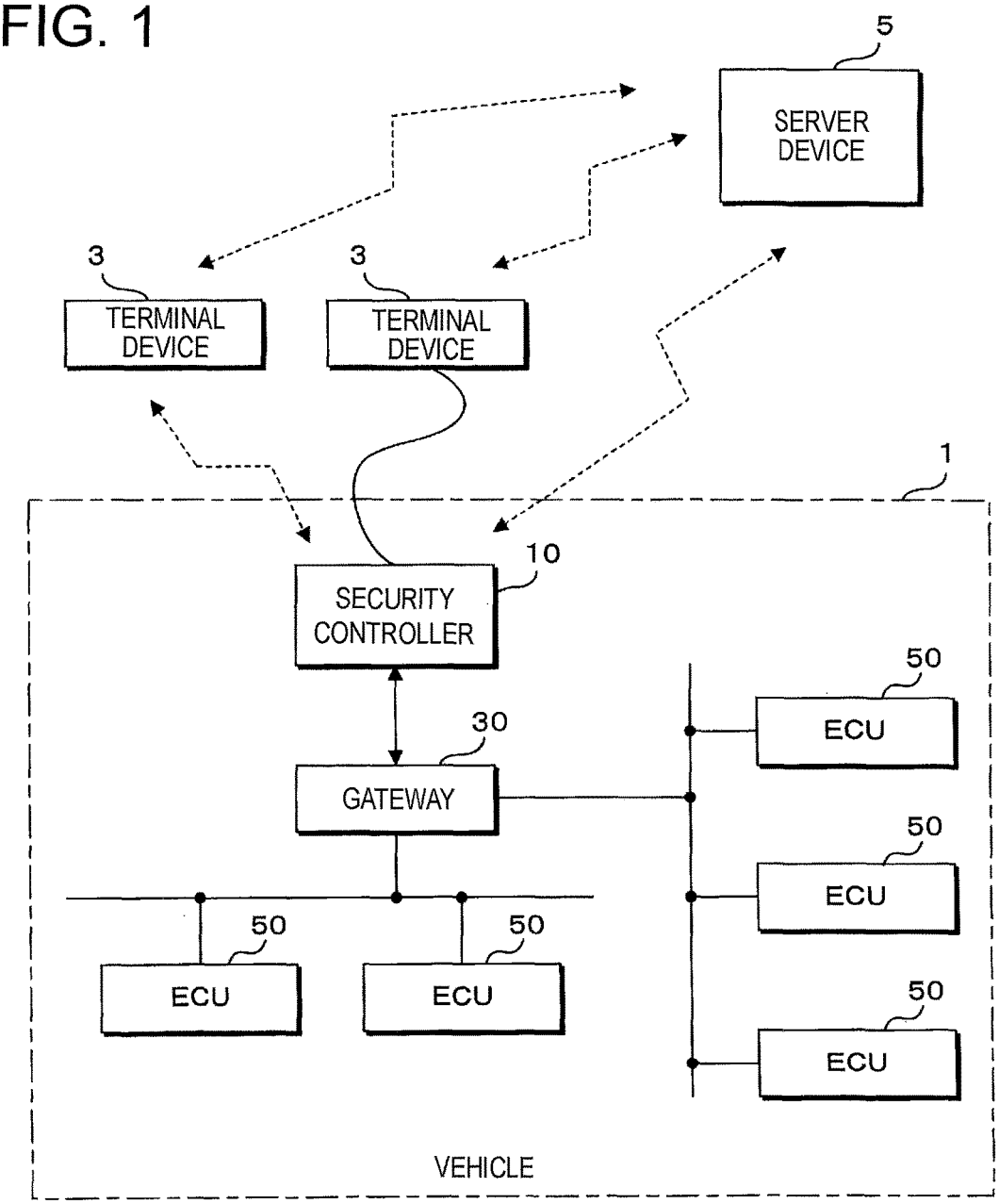
FIG. 1 is a schematic view showing a configuration of an on-board communication system according to a present embodiment.

Hereinafter, one of the present exemplary embodiments will be specifically explained with reference to drawings showing the first embodiment. FIG. 1 is a schematic view showing a configuration of an on-board communication system according to one embodiment. In FIG. 1, numeral 1 indicated by a dashed line refers to a vehicle. A security controller 10, a gateway 30 and a plurality of ECUs (Electronic control units) 50 and so on are installed in the vehicle 1. In the vehicle 1, there are a plurality of communication groups of the plurality of ECUs 50 which are connected to common communications line by a bus connection. The gateway 30 relays communication between the communication groups. In this configuration, a plurality of communication lines are connected to the gateway 30. The gateway 30, to which the security controller 10 is connected, transmits information from the security controller 10 to the ECUs 50 and gives information received from the ECUs 50 to the security controller 10.

The security controller 10, which is connected to the gateway 30, has a function of relaying the communication between devices, such as terminal devices 3 carried by users and various server devices 5, and an in-car network of the vehicle 1, which is constituted by the gateway 30, the ECUs 50 and the like. The terminal devices 3 are devices such as mobile phones, smart phones, tablet terminals and laptop PCs (personal computers) carried by users, and perform wired or wireless communication with the security controller 10. The server device 5 is installed at an appropriate location outside of the vehicle 1, and performs the communication directly with the security controller 10 of the vehicle 1 and/or indirectly via the terminal devices 3.

Figure 2:
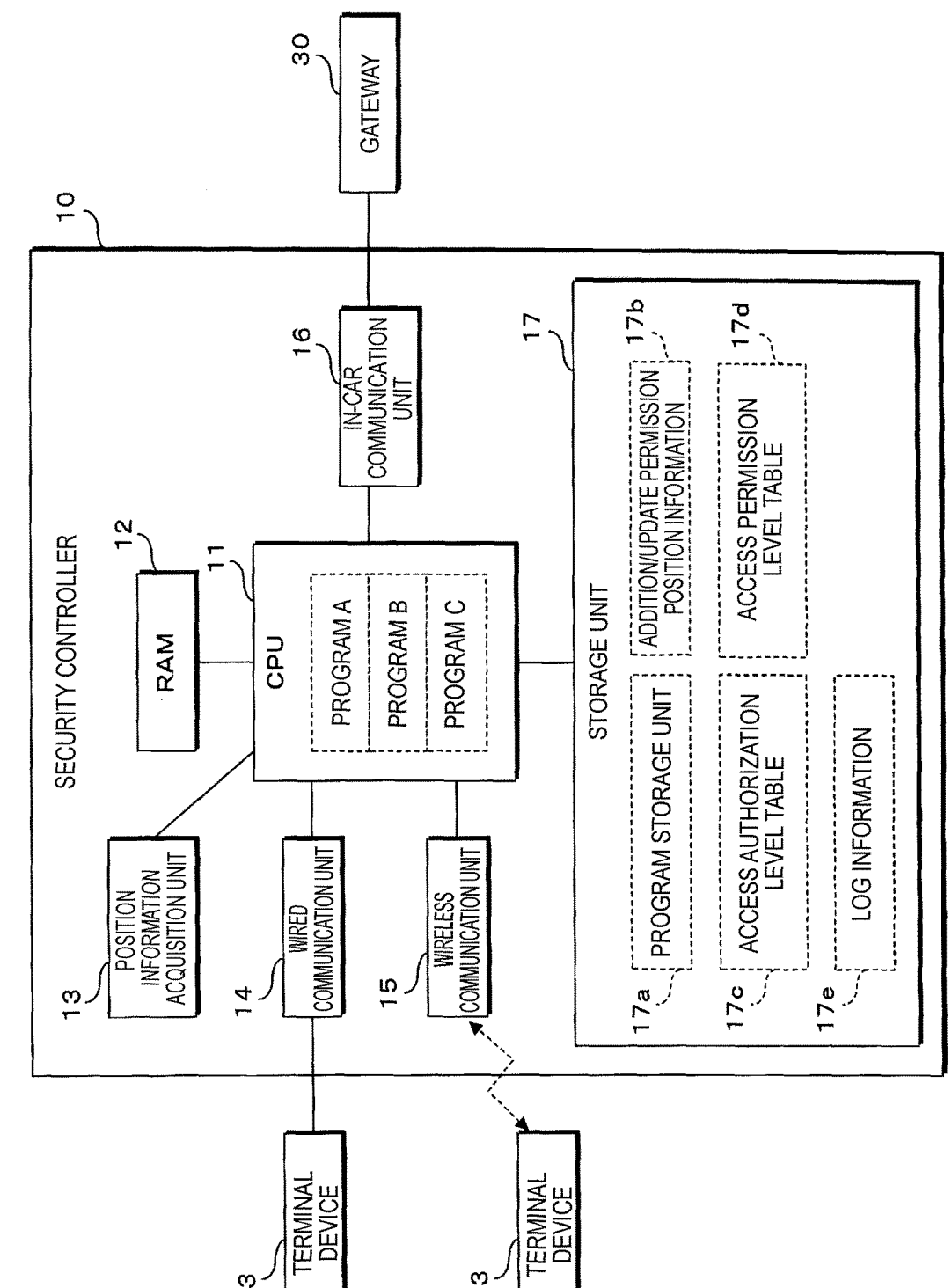
FIG. 2 is a block diagram showing a configuration of a security controller.

FIG. 2 is a block diagram showing the configuration of the security controller 10. The security controller 10 is provided with a CPU (central processing unit) 11, a RAM (random access memory) 12, a position information acquisition unit 13, a wired communication unit 14, a wireless communication unit 15, an in-car communication unit 16, a storage unit 17 and the like.

The CPU 11 is a calculation processing device which performs various processes by reading out one or a plurality of programs stored in a program storage unit 17a of the storage unit 17 on the RAM 12 and executing the same. In the shown example, the CPU 11 executes three programs A to C. The CPU 11 switches and executes a plurality of programs by means of a time-sharing system or the like, for example, enabling it to execute the plurality of programs in parallel. The RAM 12 is constituted by a memory element such as an SRAM (static RAM) or a DRAM (dynamic RAM), and temporarily stores the programs to be executed by the CPU 11 and data and the like required for their execution.

The position information acquisition unit 13 acquires position information of the vehicle 1 and gives the same to the CPU 11. An antenna or the like, which receives GPS (global positioning system) signals for example, is connected to the position information acquisition unit 13, constituting a configuration capable of calculating the position (latitude and longitude, for example) of the vehicle on the basis of the received signal. Moreover, the position information acquisition unit 13 may also calculate the position of the vehicle 1 by utilizing map information and information obtained from a sensor such as a speed sensor, an acceleration sensor or a gyro sensor. In case a car navigation device is installed in the vehicle 1, the car navigation device may also perform processing for calculating the position of the vehicle 1, and the security controller 10 may be configured to acquire the calculation result and utilize the same.

The wired communication unit 14 has a connector for connection with a communication cable and the like, and communicates with the terminal devices 3 by way of the connected communication cable. The wired communication unit 14 communicates in accordance with the USB (universal serial bus) standard, the RS232C standard or the like. The wired communication unit 14 transmits information given from the CPU 11 to the terminal device 3, and feeds information received from the terminal device 3 to the CPU 11.

The wireless communication unit 15 utilizes wireless signals, such as radio or optical signals, and performs wireless communication with the terminal devices 3 inside the vehicle 1 or within a region where the wireless signals are transmitted from the vehicle 1. The wireless communication unit 15 performs wireless communication in accordance with a wireless LAN (local area network) standard, the Bluetooth (registered trademark) standard or the like. The wireless communication unit 15 may utilize public mobile phone networks, and communicate with the server device 5 and the like set at an area remote from the vehicle 1. The wireless communication unit 15 transmits the information given from the CPU 11 to the external devices such as the terminal devices 3, the server device 5 or the like, and feeds the information received from the external devices to the CPU 11.

The in-car communication unit 16 connects to the gateway 30 installed in the vehicle 1 by way of the communication cable. The in-car communication unit 16 communicates with the gateway 30 in accordance with the CAN (controller area network) standard, the LIN (local interconnect network) standard or the like. The in-car communication unit 16 transmits the information given from the CPU 11 to the gateway 30, and feeds the information received from the gateway 30 to the CPU 11.

The storage unit 17 is constituted by a non-volatile memory element such as a flash memory, EEPROM (electrically erasable programmable read only memory) or the like, or a magnetic storage device such as a hard disc. The storage unit 17 includes the program storage unit 17a for storing the programs to be executed by the CPU 11, the data required for their execution and the like. The storage unit 17 stores addition/update permission position information 17b, an access authorization level table 17c, an access permission level table 17d, log information 17e and the like.

The security controller 10 according to this embodiment has a configuration capable of adding, updating, deleting and so on the programs to be executed by the CPU 11. For example, in case users operate a car navigation program on one of the terminal devices 3, on which a GPS receiving device is installed, then in order to utilize the terminal device 3 as a car navigation system device, the terminal device 3 acquires velocity information of the vehicle 1 and the like, making it possible to calculate the vehicle position with high precision. Acquiring the velocity information of the vehicle 1, the user can add (that is, install) the program to be transmitted to the terminal devices 3 on the security controller 10 from the car navigation programs of the terminal device 3.

For example, the security controller 10 may be configured to perform addition, update, deletion and the like of programs by employing a technique called OSGi. OSGi is a system for managing dynamic addition, execution and the like of programs referred to as bundle. The OSGi framework acting as an execution platform of the bundle operates on the CPU 11. OSGi is a conventional technique, and will not be explained in detail. The security controller 10 may also employ a technique other than OSGi for addition, update and deletion of the programs.

If the CPU 11 of the security controller 10 receives an instruction to add a program from any of the terminal devices 3, or if it receives an addition instruction based on a user operation from an operation unit (not shown) provided in proximity to a driver seat of the vehicle 1, then it performs the processing for adding a program. The added program may be one that is stored in the terminal devices 3 and acquired by the security controller 10, or one that is acquired by the server device 5 or the like. The CPU 11 of the security controller 10 stores the programs acquired from the terminal device 3, the server device 5 or the like in the program storage unit 17a of the storage unit 17. After this, the CPU 11 can read out the added program as necessary from the storage unit 17, execute the same and performs processing relevant to these programs.

The CPU 11 of the security controller 10 performs processing for updating the programs, which are already stored in the storage unit 17, for the purpose of function expansion or bug fixing or the like, for example. The processing for updating the programs may be performed when an update instruction is given from an operation unit of the vehicle 1, the terminal devices 3 or the like. Alternatively, the CPU 11 may be configured to periodically communicate with the server device 5 and the like, for example, or spontaneously determine whether to update the programs. The CPU 11 of the security controller 10 rewrites a part or the entire programs stored in the program storage unit 17a of the storage unit 17 with update information (programs, data or the like for update) acquired from the terminal devices 3, the server device 5 or the like, to update the programs.

The CPU 11 of the security controller 10 also performs processing for deleting the programs stored in the program storage unit 17a of the storage unit 17. For example, when receiving a deletion instruction from the operation unit of the vehicle 1, the terminal devices 3 or the like, the CPU 11 deletes the corresponding programs from the program storage unit 17a.

As described above, the security controller 10 according to this embodiment allows users to perform the addition, update and the like of the programs as necessary. In this configuration, there is the risk that programs prepared by malicious third parties are added on the security controller 10, and executed by the CPU 11. The security controller 10 according to this embodiment has a function of preventing unauthorized access to the vehicle 1 by unauthorized programs as well as of restricting access to the information transmitted or received via the in-car network. Hereinafter, the access restriction function with the security controller 10 will be explained.

The security controller 10 determines the level of access authorization to access the information transmitted or received via the in-car network, for each program to be executed by the CPU 11. The determination may be performed when the programs are received from the external devices and stored in the program storage unit 17a, performed whenever a program is executed, performed whenever a request to access the information is generated by the programs, or performed at other timings. The CPU 11 of the security controller 10 determines the access authorization level for each program on the basis of the information which is included in the access authorization level table 17c stored in the storage unit 17.

FIG. 3 shows a schematic view showing a configuration example of the access authorization level table 17c. The access authorization level table 17c stores information concerning program distributors in association with access authorization levels. In the shown example, company names such as "company a", "company b" and the like are given as the program distributors in the access authorization level table 17c, but these are merely examples. It is possible to use any information capable of identifying the program distributors. When adding or updating a program, the CPU 11 determines the program distributors on the basis of electronic signatures appended to the programs, information such as the IP (internet protocol) address of the server device 5 acquiring the programs, or the like.

There are three levels, namely levels one to three, as the access authorization levels of the access authorization level table 17c. This number of access authorization levels is merely an example, and it may also be two, four or more. A higher access authorization level indicates a higher access authorization. That is to say, a program with level 3 is capable of accessing more information than a program with level 1 or 2. In the example shown in the drawing, the "company a" is the manufacturer of the vehicle 1, and given the highest access authorization level 3. "Company b" and "company c" are given access authorization level 2. "Company y" and "company z" are given access authorization level 1. In the example shown in the drawing, the access authorization level is represented by numerals, which is merely an example, and it may also be represented by any other information capable of identifying the order of priority.

For an addition or update, the CPU 11 of the security controller 10 searches the corresponding distributor in the access authorization level table 17c, based on the program distributor identified by the electronic signatures and so on. If the corresponding distributor is stored in the access authorization level table 17c, the CPU 11 reads out the corresponding access authorization level, and stores the access authorization level in association with the programs to be added or updated on the storage unit 17. If the corresponding distributor is not stored in the access authorization level table 17c, the CPU 11 assigns an even lower access authorization level to the programs to be added or updated (for example, level zero or the like), or does not permit the addition or update of such programs.

The security controller 10 determines, as an access permission level, the access authorization level permitting access, for each type of information (that is, each type of information to be transmitted or received with the in-car communication unit 16) to be transmitted or received via the in-car network of the vehicle 1. The CPU 11 of the security controller 10 determines the access permission level for each type of information to be transmitted or received, in accordance with an access permission level table 17*d* stored in the storage unit 17.

FIG. 4 is a schematic view showing a configuration example of the access permission level table 17*d*. In the access permission level table 17*d*, types of the information to be transmitted or received are stored in association with access permission levels. In the example shown in the drawing, engine control information, user information, position information, vehicle velocity information and the like are given as examples of the information types in the access permission level table 17*d*. If the in-car network conforms with CAN standard, for example, these information types can be identified on the basis of an ID (identifier) number appended to a frame to be transmitted or received, or the order in which information is stored in the frame, or the like.

There are three levels, namely levels one to three, as the access permission levels of the access permission level table 17*d*. This number of access permission levels is merely an example, and it may also be two, four or more. The higher the access permission level, the higher the access authorization level that is required for access to the information. That is to say, information with an access permission level of three can be accessed by programs with an access authorization level of three or greater. Information with an access permission level of one can be accessed by programs with an access authorization level of one or greater. In the example shown in the drawing, the engine control information and the user information are set to an access permission level of 3. The position information is set to an access permission level of 2. The vehicle velocity information is set to an access permission level of 1. In the example shown in the drawing, the access permission level is represented by numerals, which is merely an example, and may also be represented by any other information capable of identifying the order of priority.

When the program is executed and generates a request to access information in the in-car network, the CPU 11 of the security controller 10 determines the access authorization level of this program and the access permission level of the information relevant to the access request. When the access authorization level of the program is equal to or greater than the access permission level of the information, the CPU 11 permits the access of the information by this program. That is, the CPU 11 acquires the information relevant to the access request from the information received by the in-car communication unit 16, and utilizes the information for the processing of this program. In contrast, when the access authorization level of the program is less than the access permission level of the information, the CPU 11 does not permit the access to the information with this program. The processing in case the access is not permitted varies depending on the programs.

When a program is executed and generates a request to transmit information over the in-car network, the CPU 11 of the security controller 10 determines the access authorization level of this program and the access permission level of the information to be transmitted. When the access authorization level of the program is equal to or greater than the access permission level of the information, the CPU 11 permits the information transmission by this program and transmits the information to the in-car network from the in-car communication unit 16. In contrast, when the access authorization level of the program is less than the access permission level of the information, the CPU 11 does not permit the information transmission by the program.

The security controller 10 according to this embodiment performs the processes for adding, updating and so on of programs as described above, while restricting the addition or update of programs according to the access authorization level and the position of the vehicle 1. The CPU 11 of the security controller 10 restricts the addition and update of programs with an access authorization level of three, for example, depending on the position of the vehicle 1, and does not district the addition or update of programs with an access authorization level of one or two depending on the position of the vehicle 1.

The security controller 10 stores information indicating positions of the vehicle 1 where the processing for the addition and update of a program is allowed, as the addition/update permission position information 17*b*, in the storage unit 17. In the addition/update permission position information 17*b*, relevant facilities (dealers, maintenance shops or the like) of the manufacturer of the vehicle 1, may be registered for a plurality of locations. For example, information such as latitude and longitude can be employed for the position information.

When receiving the request for addition or update of a program, the CPU 11 of the security controller 10 permits the processing for adding or updating the program if the position of the vehicle 1 according to the position information acquired by the position information acquisition unit 13 corresponds to any of the positions registered in the addition/update permission position information 17*b*, and then performs this processing. The CPU 11 may permit the processing for adding or updating the program, not only in case that the vehicle 1 is positioned to be completely coincident with the registered position, but also in case that the vehicle 1 is positioned within a predetermined region, such as a predetermined region within several hundreds of meters radius from the registered position. If the vehicle 1 is not positioned at the registered position, the CPU 11 does not permit the processing for adding or updating any program, and will not perform the processing therefor.

Depending on the amount of information which is transmitted to the in-car network by the execution of a program, the security controller 10 according to this embodiment also restricts the information transmission to the in-car network with this program. To this end, the CPU 11 of the security controller 10 monitors the amount of transmitted information for each program per unit time. When the amount of information transmission for any of the programs surpasses a predetermined amount, the CPU 11 blocks the information transmission with this program. In this condition, the CPU 11 may temporarily or completely block the transmission of information for all programs, or only the transmission of information for the program with the amount of transmitted information surpassing the predetermined amount.

The predetermined amount for the determination of whether or not the CPU 11 blocks the information transmission may not be the same value for all programs, but can be different values depending on the programs. For example, the predetermined value may be set to a larger one for allowing transmission of more information for programs with high access authorization levels, or set to a smaller one to limit the amount of information to be transmitted for programs with low access authorization levels.

The security controller 10 according to this embodiment generates the log information 17*e* indicating the restriction processing and stores the same on the storage unit 17, in case of performing restriction processing such as the above-described restriction to access information, the restriction of information transmission, the restriction of addition or update of programs and the prevention of transmission based on the amount of information transmission. The log information 17e may include information on the a program causing the restriction processing, date and time of the restriction processing, content of the restriction processing and the like, for example. The log information 17e can also be arranged to be read out only when a specialized terminal device 3 is connected to the wired communication unit 14 at a dealer, maintenance shop or the like of the vehicle 1.

Figure 5:
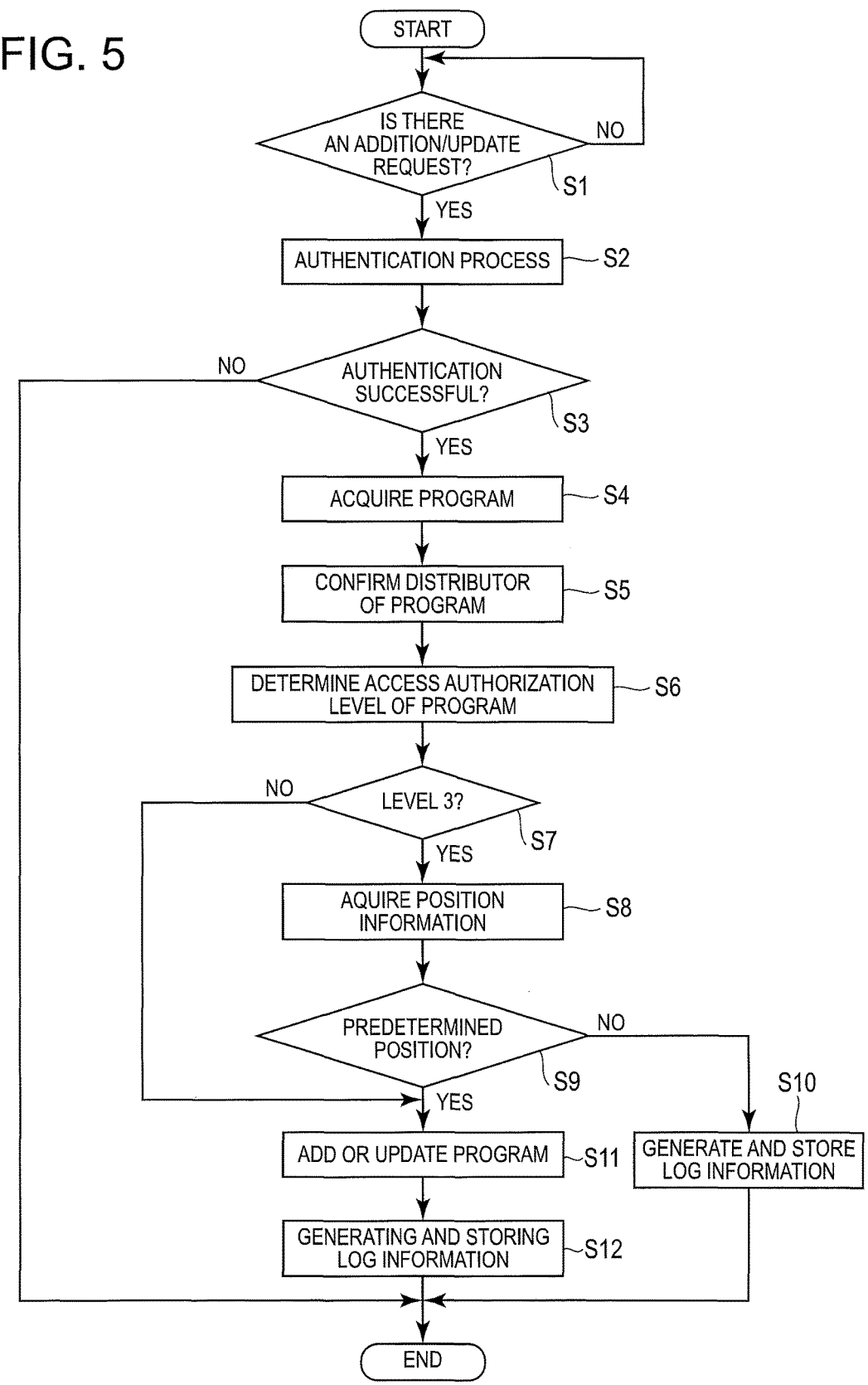
FIG. 5 is a flowchart showing a procedure for processing restriction of addition or update of programs performed by the security controller.

Next, the processes performed by the security controller 10 according to this embodiment will be explained in detail with reference to flowcharts. FIG. 5 is a flowchart showing the procedure for restricting addition and update of programs performed by the security controller 10. In the process shown in FIG. 5, it is assumed that a terminal device 3 is connected to the wired communication unit 14 of the security controller 10 by way of a communication cable so as to ensure the communication between the security controller 10 and the terminal device 3 upon completion of an authentication process. The security controller 10 receives the instruction to add or update a program from the terminal device 3, communicating with the server device 5 by way of the terminal device 3, and acquiring the program to be added or updated from the server device 5.

The CPU 11 of the security controller 10 determines whether a request for addition or update of a program has been received from the terminal device 3 (step S1). If no request has been received (S1: NO), the CPU 11 stands by until receiving the a. When receiving an instruction for the addition or update of a program (S1: YES), the CPU 11 performs the authentication process with the server device 5 by means of the communication via the terminal device 3 connected to the wired communication unit 14 (step S2). For example, the CPU 11 performs the authentication process with the server device 5 by utilizing the authentication information, such as user IDs or passwords, stored in the storage unit 17. The CPU 11 determines whether or not the authentication process has succeeded (step S3), and terminates the processing and does not perform the processing for adding or updating the programs in case that the authentication process has failed (S3: NO).

If the authentication process has succeeded (S3: YES), the CPU 11 acquires the program to be processed from the server device 5 by way of the terminal device 3 (step S4), and temporarily stores the same in the RAM 12 or the like. The CPU 11 confirms the distributor of the acquired program on the basis of the electronic signature appended to this program (step S5), and determines the access authorization level of the program on the basis of the access authorization level table 17c stored in the storage unit 17 (step S6).

Next, the CPU 11 determines whether or not the access authorization level of the program is equal to level 3 (step S7). If the access authorization level is level 3 (S7: YES), the CPU 11 acquires the position information in the position information acquisition unit 13 (step S8), and determines whether the vehicle 1 is positioned at the predetermined position (step S9). If the vehicle 1 is not positioned at the predetermined position (S9: NO), the CPU 11 does not add or update the program, generates the log information 17e, stores the same in the storage unit 17 (step S10), and terminates the processing.

If the access authorization level of the program is not level 3, but level 2 or less (S7: NO), or if the vehicle 1 is positioned at the predetermined position (S9: YES), the CPU 11 adds or updates the program (step S11), generates the log information 17e, stores the same in the storage unit 17 (step S12), and terminates the processing. In this case, the CPU 11 stores the program, which is temporarily stored in the RAM 12 or the like, in the program storage unit 17a of the storage unit 17, and performs the processing for registering the information required for execution of this program so as to add or update the program.

Figure 6:
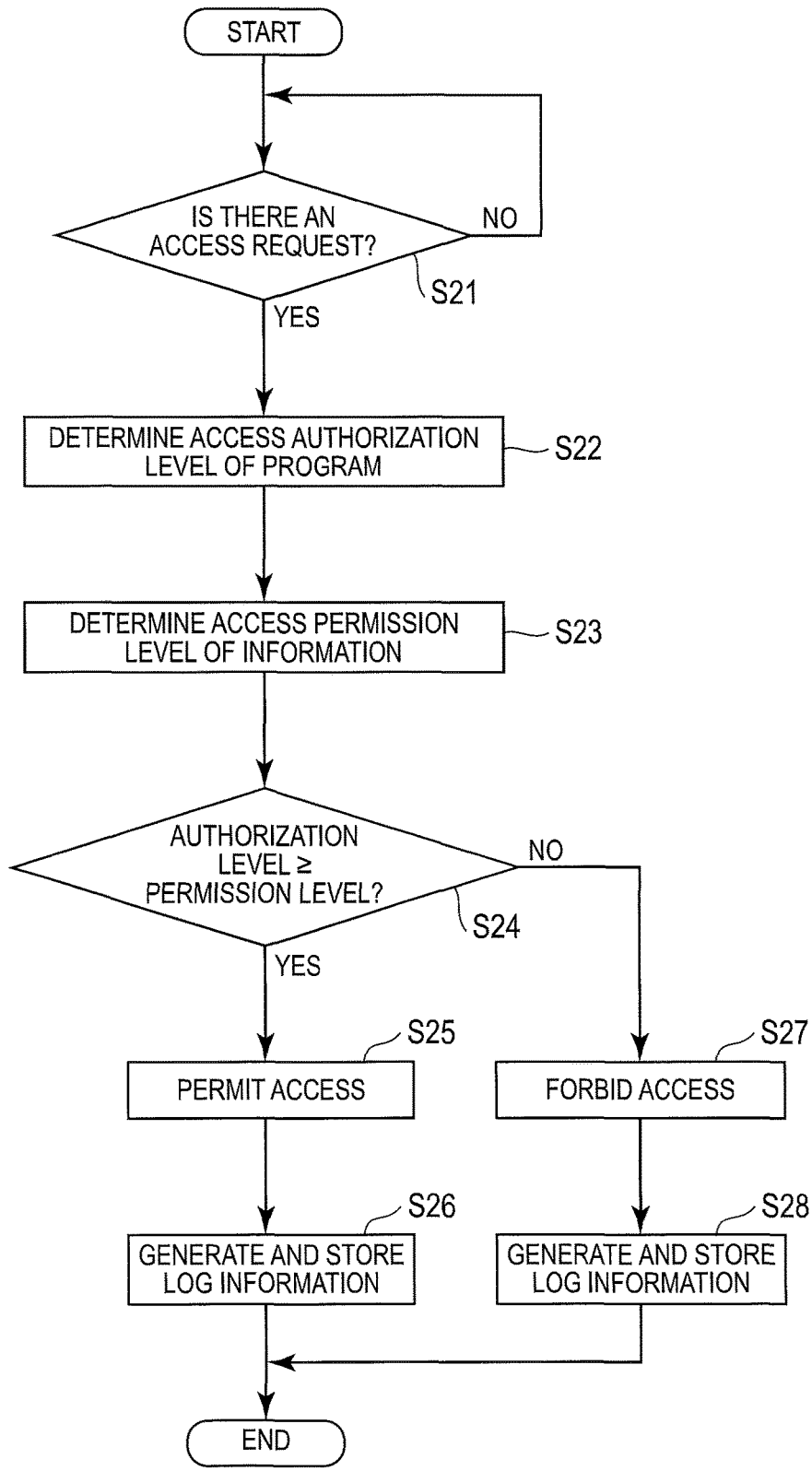
FIG. 6 is a flowchart showing a procedure for processing access restriction performed by the security controller.

FIG. 6 is a flowchart showing the procedure for processing access restriction performed by the security controller 10. First, the CPU 11 of the security controller 10 determines whether a request to access the information of the in-car network is made by the execution of the program stored in the program storage unit 17a (step S21). If there is no access request (S21: NO), the CPU 11 stands by until there is an access request.

If there is an access request (S21: YES), the CPU 11 determines the access authorization level of the program making the access request (step S22). In case the access authorization level determined in step S6 of the flowchart in FIG. 5 is stored in the storage unit 17, the CPU 11 may read out the former determination result in step S22. The CPU 11 determines the access permission level of the information for which the access request is made, on the basis of the access permission level table 17d stored in the storage unit 17 (step S23).

Next, the CPU 11 determines whether or not the access authorization level of the program determined in step S22 is equal to or greater than the access permission level of the information determined in step S23 (step S24). If the access authorization level is equal to or greater than the access permission level (S24: YES), the CPU 11 permits the program to have access to the information (step S25), generates the log information 17e, stores the same on the storage unit 17 (step S26), and feeds the information received at the in-car communication unit 16 to the program making the access request and performs the processing therefor. In case the access authorization level is lower than the access permission level (S24: NO), the CPU 11 forbids the program from having access to the information (step S27), generates the log information 17e, stores the same on the storage unit 17 (step S28), and terminates the processing.

Figure 7:
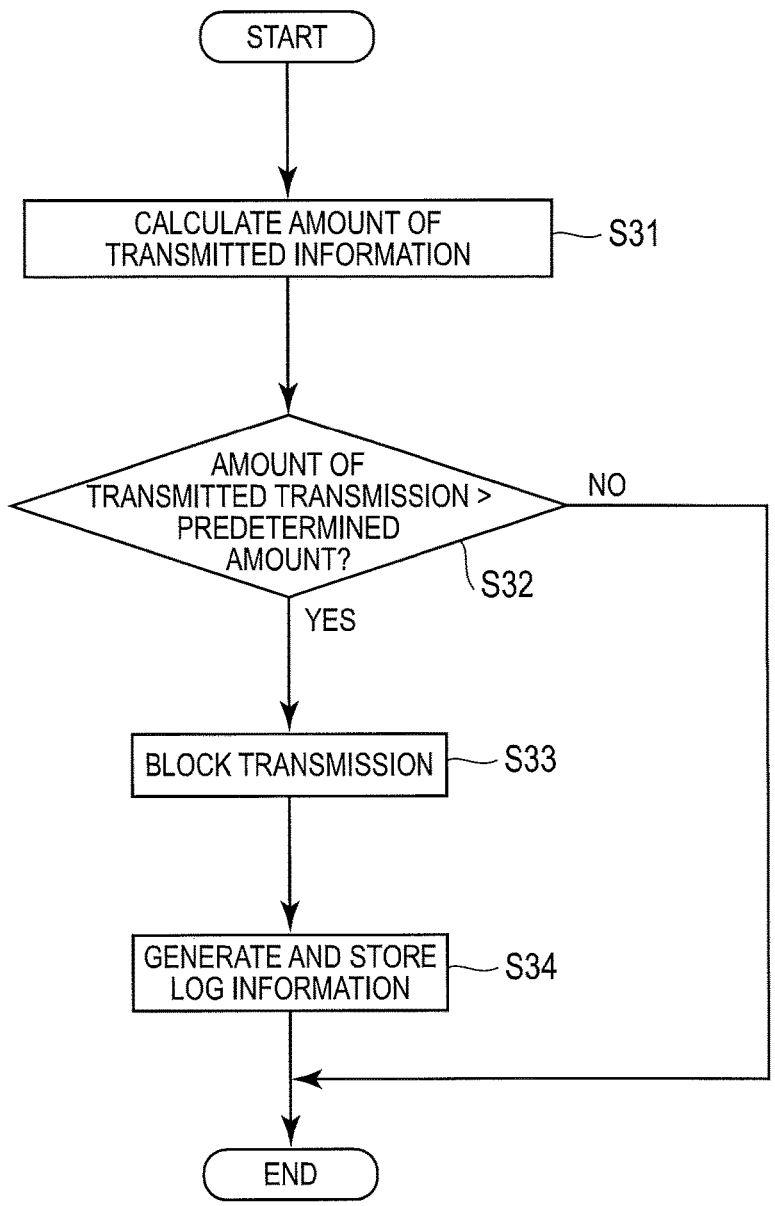
FIG. 7 is a flowchart showing a procedure for processing transmission restriction which is performed by the security controller on the basis of an amount of information transmission.

FIG. 7 is a flowchart showing the procedure for a transmission restriction which is performed by the security controller 10 on the basis of the amount of information transmission. The CPU 11 of the security controller 10 calculates the amount of information transmission per unit time from the in-car communication unit 16 to the in-car network, for each of the executed programs (step S31). The CPU 11 determines whether or not the calculated amount of information transmission surpasses the predetermined amount which is predetermined for the respective access authorization level of the programs (step S32), and terminates the processing without performing the transmission restriction if the amount of information transmission does not surpass the predetermined amount (S32: NO).

If the amount of information transmission of any program surpasses the predetermined amount (S32: YES), the CPU 11 prevents that program from transmitting the information to the in-car network (step S33) and does not transmit the information afterwards. The CPU 11 generates the log information 17e relevant to the prevention of the information transmission, stores the same on the storage unit 17 (step S34), and terminates the processing. The CPU 11 periodically performs the process shown in FIG. 7 for each of the plurality of programs, which are executed in parallel.

Figure 8:
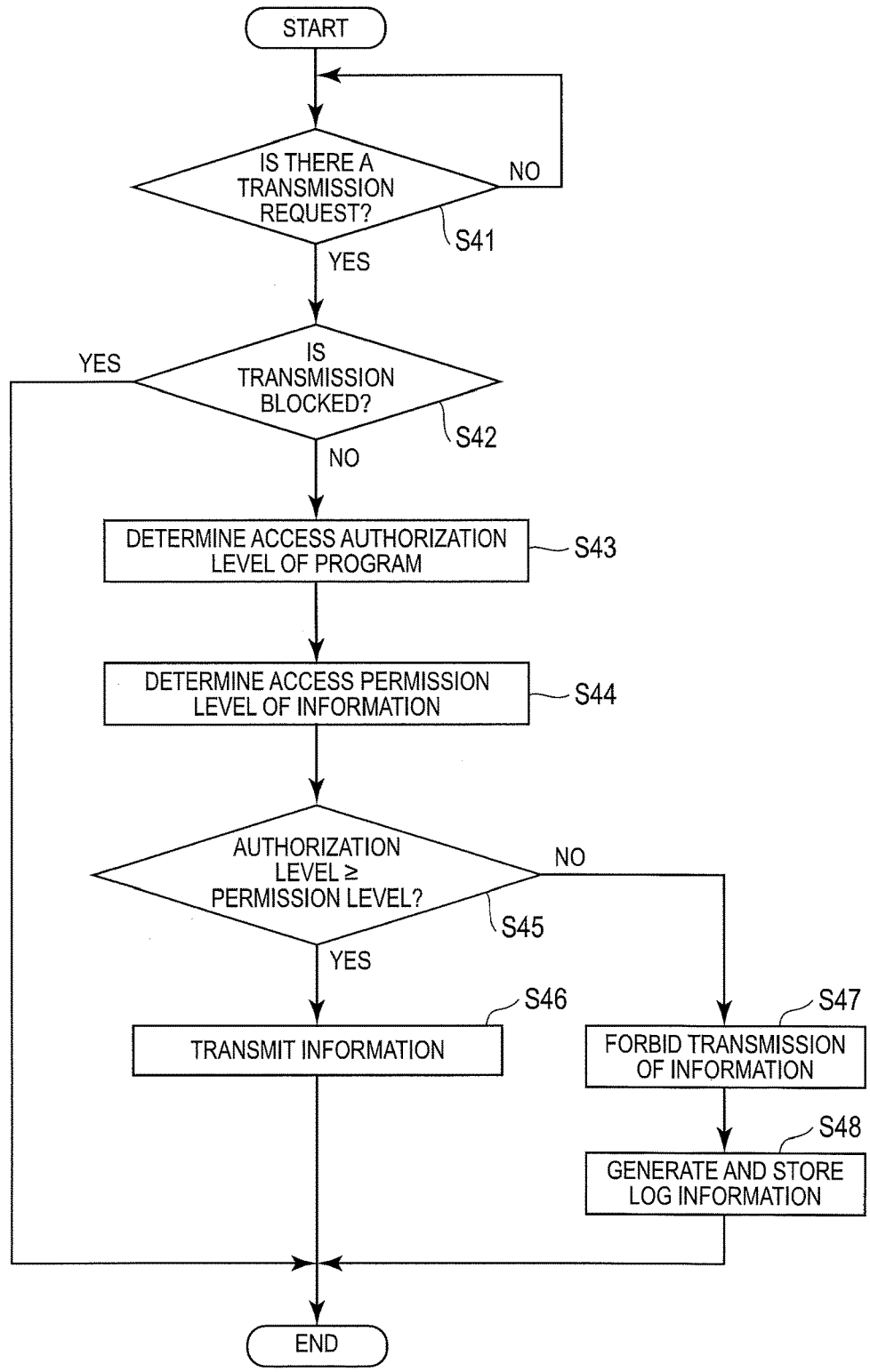
FIG. 8 is a flowchart showing a procedure for processing transmission restriction which is performed by the security controller on the basis of an access authorization level.

FIG. 8 is a flowchart showing the procedure for the transmission restriction process, which is performed by the security controller 10 on the basis of the access authorization level. First, the CPU 11 of the security controller 10 determines whether or not a request to transmit information to the in-car network is made by execution of a program stored in the program storage unit 17*a* (step S41). If there is no such information transmission request (S41: NO), the CPU 11 stands by until there is an information transmission request. If there is an information transmission request (S41: YES), the CPU 11 further determines whether or not the information transmission is blocked for this program by means of the transmission restriction processing shown in FIG. 7 (step S42). If the information transmission is blocked (S42: YES), the CPU 11 terminates the processing.

If the information transmission is not blocked (S42: NO), the CPU 11 determines the access authorization level of the program making the information transmission request (step S43). The CPU 11 determines the access permission level of the information for which the transmission is requested, on the basis of the access permission level table 17*d* stored in the storage unit 17 (step S44). Next, the CPU 11 determines whether or not the access authorization level of the program determined in step S43 is equal to or greater than the access permission level of the information determined in step S44 (step S45). If the access authorization level is equal to or greater than the access permission level (S45: YES), the CPU 11 permits the program to transmit information (step S46), and transmits the information to the in-car network on the in-car communication unit 16. If the access authorization level is lower that the access permission level (S45: NO), the CPU 11 forbids the program from transmitting information (step S47), generates the log information 17*e*, stores the same on the storage unit 17 (step S48), and terminates the processing.

The processes shown in FIG. 5 to FIG. 8 can be achieved by executing with the CPU 11 a basic program (for example, OS (operating system), OSGi framework or the like) other than the programs to be added, updated and so on. The CPU 11 executes the basic program and the programs to be added, updated or the like in parallel. One of the programs to be added, updated or the like may be configured to perform the processing shown in FIG. 5 to FIG. 8.

The communication system with the above configuration according to this embodiment is configured to allow the ECUs 50 and the like installed in the vehicle 1 to communicate with the terminal devices 3, or the server device 5 and the like by way of the security controller 10. The security controller 10 can execute one or a plurality of programs involving the transmission and reception of the information, and can add or update these programs. The security controller 10 performs the processing for restricting the access to the information of the in-car network generated by execution of the program on the basis of the access authorization level for each program and the access permission level for each type of information. With such an access restriction, it is possible to provide much information relevant to the vehicle 1 to the program with high reliability, thus offering more sophisticated services, as well as to prevent outside leakage of sensitive information by restricting the information transmission to programs with low reliability.

The security controller 10 performs the processing for restricting the information transmission on the basis of the access authorization level for each program and the access permission level for each type of information in a similar way, also in case that the information is transmitted to the in-car network by the execution of programs. In this way, it is possible to prevent unauthorized programs from improperly transmitting the information to the in-car network.

The security controller 10 acquires the position information relevant to the vehicle 1 with the position information acquisition unit 13, and restricts the addition and update of programs depending on whether or not the vehicle 1 is positioned at a predetermined position or within a predetermined position region. Thus, it is possible to prevent the addition, update or the like of unauthorized programs prepared by malicious third parties. The security controller 10 performs the restriction of the addition or update depending on the position of the vehicle 1, for programs with high access authorization levels. Thus, it is possible to prevent programs with high access authorization levels from being improperly added, updated or the like, while it is possible to add, update or the like programs with low access authorization levels, irrespective of the position of the vehicle 1, which improves user convenience.

The security controller 10 monitors the amount of information transmission to the in-car network due to the execution of programs, and blocks the information transmission if the amount of information transmission surpasses a predetermined amount. The security controller 10 allows programs with high access authorization level to send much information, and keeps down the amount of information which programs with low access authorization level are allowed to send. Thus, it is possible to prevent unauthorized programs from transmitting large amounts of information to the in-car network.

The security controller 10 generates the log information 17*e* when performing the access restriction, and stores the same on the storage unit 17. Thus, it is possible to examine whether or not unauthorized programs are present when fixing or inspecting the vehicle 1, for example.

In this embodiment, the gateway 30 is connected to the security controller 10 while a plurality of ECUs 50 are connected to the gateway 30. This configuration of the in-car network is merely one example, and the present exemplary embodiments are not limited to this configuration. For example, the security controller 10 may also function as the gateway, and the plurality of ECUs 50 may be connected to the security controller 10. Alternatively, any of the ECUs may also function as a security controller 10. A plurality of security controllers 10 may be installed in the vehicle 1.

The security controller 10 is provided with both of the wired communication unit 14 and the wireless communication unit 15. But, the present exemplary embodiments are not limited to this configuration. The security controller 10 may be provided with only one of the wired communication unit 14 and the wireless communication unit 15. If the vehicle 1 is an electric automobile, for example, if it is possible to supply electric power via a power supply cable from an external power supply device, the security controller 10 can be configured to communicate with the external device by means of electric power line communication via the power supply cable. The security controller 10 may be configured such that a recording medium, such as a memory card or an optical disc, is attachable, and arranged to acquire the programs to be added or updated from the record medium.

Second Embodiment

Figure 9:
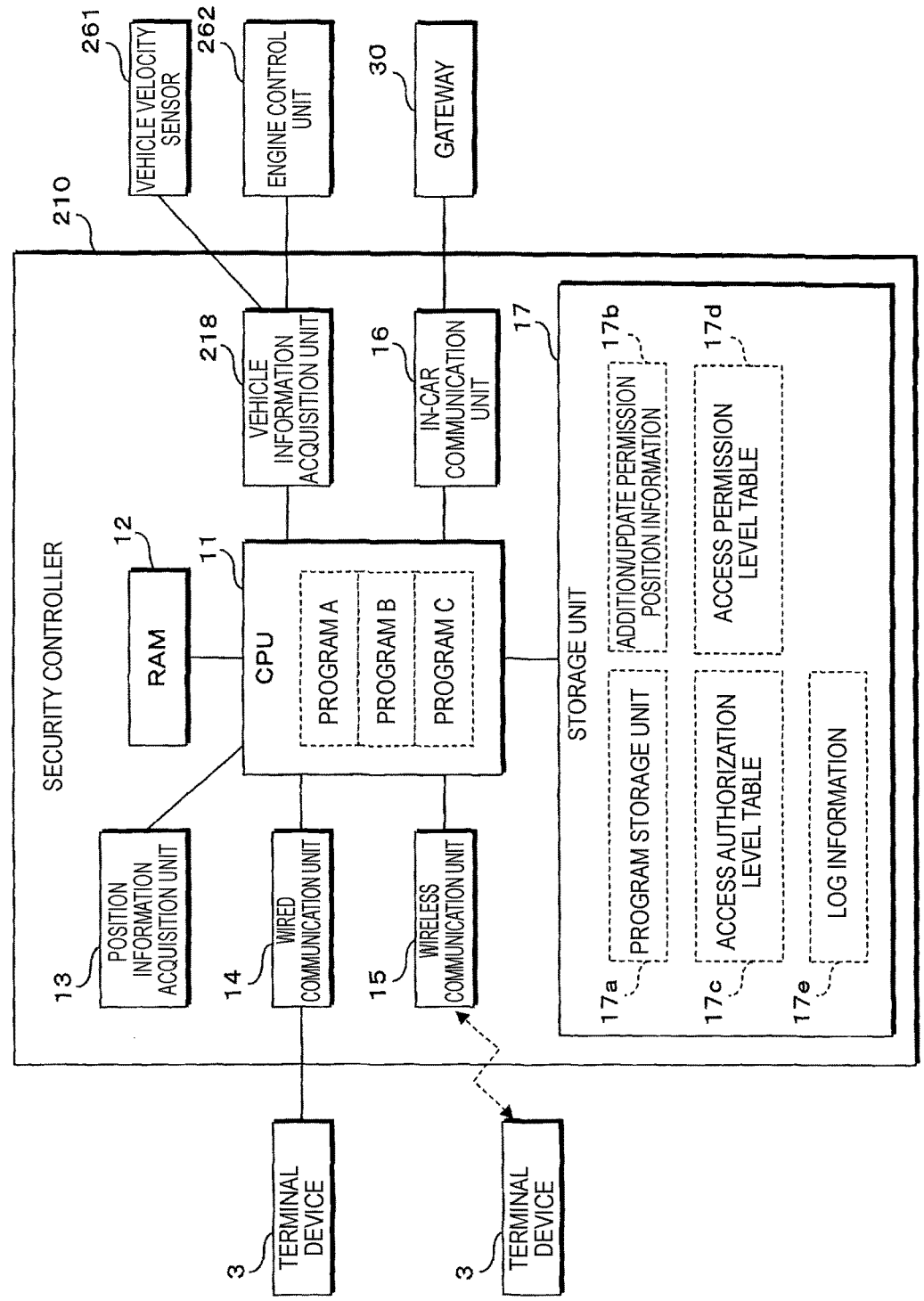
FIG. 9 is a block diagram showing a configuration of the security controller according to a second embodiment.

FIG. 9 is a block diagram showing a configuration of a security controller 210 according to a second embodiment. The security controller 210 according to the second embodiment is provided with a vehicle information acquisition unit 218. The vehicle information acquisition unit 218 acquires information from a vehicle velocity sensor 261 and an engine control unit 262 installed in the vehicle 1, and gives the information to the CPU 11. The vehicle velocity sensor 261 detects a traveling velocity of the vehicle 1, and outputs a detection result to the vehicle information acquisition unit 218. The engine control unit 262 is a device which controls the engine operation of the vehicle 1, and outputs information indicating whether or not the engine is running or stopped to the vehicle information acquisition unit 218.

The CPU 11, which the information is given to from the vehicle information acquisition unit 218, determines whether the vehicle 1 is running or stopped, on the basis of this information. The CPU 11 can determine whether the vehicle 1 is running or stopped, depending on whether or not the vehicle velocity detected with the vehicle velocity sensor 261 surpasses a threshold. The CPU 11 determines whether the vehicle 1 is in the running state or stopped state on the basis of whether the engine is running or stopped. In this embodiment, the CPU 11 determines that the vehicle 1 is in the stopped state if the vehicle velocity is not greater than the threshold while the engine is stopped. The CPU 11 determines that the vehicle 1 is running if the vehicle velocity surpasses the threshold or if the engine is running.

The security controller 10 according to the first embodiment described above restricts the addition, update and so on of programs according to the access authorization level and the position of the vehicle 1. The security controller 210 according to the second embodiment further performs a restriction according to the state of the vehicle 1, in addition to those restrictions. The CPU 11 of the security controller 210 according to the second embodiment performs the restriction of the addition or update of programs with the access authorization level of three, for example, depending on the position of the vehicle 1 as well as the state of the vehicle 1.

The CPU 11 of the security controller 210 determines whether or not the position of the vehicle 1 according to the position information acquired by the position information acquisition unit 13 is at any of the positions registered in the addition/update permission position information 17b, if a request for addition or update of programs is given. If the vehicle 1 is not positioned at any of the registered positions, the CPU 11 does not permit the processing for the addition or update of programs, and does not perform the processing therefor.

The CPU 11 of the security controller 210 determines whether or not the vehicle 1 is in the stopped state, on the basis of the information acquired by the vehicle information acquisition unit 218, in case a request for the addition or update of a program is received. If the vehicle 1 is stopped, the CPU 11 permits the processing for the addition or update of programs, and performs the processing. In case the vehicle 1 is not stopped and is running, the CPU 11 does not permit the processing for the addition or update of programs, and does not perform the processing.

FIG. 10 is a flowchart showing the procedure for processing the restriction of addition and update of programs performed by the security controller 210 according to the second embodiment. In this flowchart, the process corresponding to steps S1 to S6 shown in FIG. 5 is simply shown as a predetermined process in step S51. The security controller 210 according to the second embodiment performs the same process in steps S1 to S6 shown in FIG. 5, as the security controller 10 according to the first embodiment.

The CPU 11 of the security controller 210 according to second embodiment performs as predetermined processes, the authentication process, the process for acquiring the program from the server device 5, the process for confirming the distributor of the acquired program and determining the access authorization level and so on (step S51).

After this, the CPU 11 determines whether or not the access authorization level of the program to be added or updated is level 3 (step S52). If the access authorization level is level 3 (S52: YES), the CPU 11 acquires the position information in the position information acquisition unit 13 (step S53), and determines whether or not the vehicle 1 is positioned at the predetermined position (step S54). If the vehicle 1 is not positioned at the predetermined position (S54: NO), the CPU 11 generates the log information 17e without performing the addition or update of the program, stores the same in the storage unit 17 (step S57), and terminates the processing.

If the vehicle 1 is positioned in the predetermined position (S54: YES), the CPU 11 acquires the vehicle information from the vehicle velocity sensor 261 and the engine control unit 262 in the vehicle information acquisition unit 218 (step S55). The CPU 11 determines whether or not the vehicle 1 is in the stopped state, on the basis of the acquired vehicle information (step S56). If the vehicle 1 is not in the stopped state (S56: NO), the CPU 11 generates the log information 17e without performing the addition or update of programs, stores the same in the storage unit 17 (step S57), and terminates the processing.

If the access authorization level is not level 3, but is level 2 or lower (S52: NO) or if the vehicle 1 is in the stopped state (S56: YES), the CPU 11 performs the addition or update of the program (step S58), generates the log information 17e, stores the same on the storage unit 17 (step S59), and terminates the processing.

The above security controller 210 according to second embodiment restricts the addition or update of programs depending on whether or not the vehicle 1 is in the stopped state. Thus, it is possible to prevent the addition or update of programs affecting running during the running of the vehicle 1.

In this embodiment, the security controller 210 is configured to acquire the vehicle velocity detected with the vehicle velocity sensor 261 and the engine operation state as information regarding the vehicle 1. The present exemplary embodiments are not limited to this configuration. The security controller 210 may be configured to acquire only either one of the vehicle velocity and the engine operation state. The security controller 210 may also be configured to acquire information other than the vehicle velocity and the engine operation state. The security controller 210 may also be configured to acquire information of a state of an IG (ignition) switch for starting the engine, a position of the shift lever, an operation state of the brakes or the like, for example.

The security controller 210 is configured to determine whether or not the vehicle 1 is in the stopped state, on the basis of the acquired vehicle information, and restrict the addition or update of programs accordingly. But, the present exemplary embodiments are not limited to this configuration. The security controller 210 may also be configured to restrict the addition or update of programs depending on a condition other than whether or not the vehicle 1 is in the stopped state. For example, the security controller 210 may be configured to restrict the addition or update of programs depending on whether or not the IG switch is in off-state. Also, the security controller 210 may be configured to restrict the addition or update of programs depending on whether or not someone is present in the vehicle 1.

The vehicle information acquisition unit 218 of the security controller 210 is configured to acquire information directly from the vehicle velocity sensor 261 and the engine control unit 262. But, the present exemplary embodiments are is not limited to this configuration. For example, the vehicle information acquisition unit 218 may also be configured to acquire the information from the vehicle velocity sensor 261 and the engine control unit 262 by means of communication via the in-car network.

The remaining configuration of the on-board communication system according to the second embodiment is the same as that of the on-board communication system according to the first embodiment. The same symbols are assigned to the same portions, and will not be explained in detail.

LIST OF REFERENCE NUMERALS

1: vehicle
3: terminal device (external device)
5: server device (external device)
10: security controller (access restriction device)
11: CPU (processing unit, program addition/update means, first determination means, second determination means, access restriction means, position information acquisition means, position determination means, program addition/update restriction means, blocking means, log information generation means, vehicle stop determination means)
12: RAM
13: position information acquisition unit (position information acquisition means)
14: wired communication unit (second communication unit)
15: wireless communication unit (second communication unit)
16: in-car communication unit (first communication unit)
17: storage unit (access authorization level information storage unit, log information storage unit)
17a: program storage unit
17b: addition/update permission position information
17c: access authorization level table (access authorization level information)
17d: access permission level table
17e: log information
30: gateway (on-board device)
50: ECU (on-board device)
210: security controller (access restriction device)
218: vehicle information acquisition unit (vehicle information acquisition means)
261: vehicle velocity sensor
262: engine control unit

What is claimed is:

1. An access restriction device to be installed in a vehicle, the access restriction device comprising:
a first receiver/transmitter communicating with an on-board device by way of an in-car network arranged in the vehicle;
a second receiver/transmitter communicating with an external device;
a first memory storing a program which performs processing on information transmitted and received by the first receiver/transmitter and/or processing on information transmitted and received by the second receiver/transmitter;
a processor programmed to execute one or a plurality of programs stored in the first memory, including:
performing addition or update of a program to be executed by the processor by communicating between the second receiver/transmitter and the external device;
determining, for each program, a level of access authorization with respect to information received with the first receiver/transmitter;
determining, for each type of information received with the first receiver/transmitter, a level of access authorization for permission to access the information received with the first receiver/transmitter, the received information being identified on the basis of: (i) an identifier number appended to a frame to be transmitted or received, or (ii) an order in which information is stored in the frame; and
acquire position information of the vehicle;
determine whether or not the position of the vehicle according to the acquired position information is a predetermined position or within a predetermined position region;
determine whether or not the vehicle is in a stopped state, depending on the acquired information regarding the vehicle;
restricting access to the information, depending on: (i) the determined level of access authorization of the received information and the determined level of access authorization for permission, when an access request is made for the information received by the first receiver/transmitter, (ii) a determination result of the position of the vehicle with respect to the predetermined position or the predetermined position region, and (iii) if the vehicle is determined as being not in the stopped state.

2. The access restriction device according to claim 1, wherein the processor restricts information transmission from the first receiver/transmitter to the on-board device, depending on the determined level of access authorization of the received information and the determined level of access authorization for permission, when a request to transmit information from the first receiver/transmitter to the in-car network is made.

3. The access restriction device according to claim 1, wherein the processor restricts the addition or update of the program depending on the access authorization level of the program and the determination result.

4. The access restriction device according to claim 1, wherein the acquired information is velocity information of the vehicle and/or information indicating an operation state of a motor of the vehicle.

5. The access restriction device according to claim 1, further comprising:
a second memory that stores access authorization level information in which a plurality of program distributors are associated with respective levels of access authorization;
wherein the processor determines the level of access authorization of the received information on the basis of the access authorization level information stored in the second memory.

6. The access restriction device according to claim 1, wherein the processor is further programmed to:
block the information transmission when the amount of information transmitted from the first receiver/transmitter to the in-car network surpasses a predetermined amount.

7. The access restriction device according to claim 6, wherein the predetermined amount is an amount determined according to the level of access authorization of the program.

8. The access restriction device according to claim 1, wherein the processor is further programmed to:
in response to the processor restricting access to information, generate log information capturing information on the access restriction; and
a third memory that stores the generated log information.

9. An on-board communication system comprising:
one or more on-board devices, and
an access restriction device connected to the one or more on-board devices by way of an in-car network, the access restriction device including:
a first receiver/transmitter communicating with an on-board device by way of an in-car network arranged in the vehicle;
a second receiver/transmitter communicating with an external device;
a memory storing a program which performs processing on information transmitted and received from the first receiver/transmitter and/or processing on information transmitted and received from the second receiver/transmitter;
a processor programmed to execute the program stored in the memory, the program having steps including:
performing addition or update of a program to be executed by the processor by communicating between the second receiver/transmitter and the external device;
determining, for each program, a level of access authorization with respect to information received with the first receiver/transmitter;
determining, for each type of information received with the first receiver/transmitter, a level of access authorization for permission to access the information received with the first receiver/transmitter, the received information being identified on the basis of: (i) an identifier number appended to a frame to be transmitted or received, or (ii) an order in which information is stored in the frame;
acquiring position information of the vehicle;
determining whether or not the position of the vehicle according to the acquired position information is a predetermined position or within a predetermined position region;
determining whether or not the vehicle is in a stopped state, depending on the acquired information regarding the vehicle; and
restricting access to the information, depending on the determined level of access authorization of the received information and the determined level of access authorization for permission, when an access request is made for the information received by the first receiver/transmitter, (ii) a determination result of the position of the vehicle with respect to the predetermined position or the predetermined position region, and (iii) if the vehicle is determined as being not in the stopped state;
wherein the on-board device is configured to communicate with the external device via the access restriction device.

10. A communication restriction method utilizing an access restriction device to be installed in a vehicle, the access restriction device including: (i) a first receiver/transmitter which communicates with an on-board device by way of an in-car network arranged in the vehicle; (ii) a second receiver/transmitter which communicates with an external device; (iii) a memory storing a program which performs processing concerning information to be transmitted and received with the first receiver/transmitter and/or processing concerning information to be transmitted and received with the second receiver/transmitter; (iv) a processor which executes one or a plurality of programs stored in the memory; the communication restriction method restricting the communication of the on-board device and the external device by utilizing the access restriction device; the communication restriction method comprising:
determining, for each program, a level of access authorization for information received with the first receiver/transmitter;
determining, for each type of information received in the first receiver/transmitter, a level of access authorization for permission to access information received with the first receiver/transmitter, the received information being identified on the basis of: (i) an identifier number appended to a frame to be transmitted or received, or (ii) an order in which information is stored in the frame;
acquiring position information of the vehicle;
determining whether or not the position of the vehicle according to the acquired position information is a predetermined position or within a predetermined position region;
determining whether or not the vehicle is in a stopped state, depending on the acquired information regarding the vehicle; and
restricting access to the information, depending on: (i) the determined level of access authorization of the received information and the determined level of access authorization for permission, when an access request is made for the information received by the first receiver/transmitter, (ii) a determination result of the position of the vehicle with respect to the predetermined position or the predetermined position region, and (iii) if the vehicle is determined as being not in the stopped state.

* * * * *